US012643744B2

(12) United States Patent
Eckmann et al.

(10) Patent No.: US 12,643,744 B2
(45) Date of Patent: Jun. 2, 2026

(54) METHOD FOR INSPECTING A FACILITY, PREFERABLY A CONVEYING FACILITY

(71) Applicant: ContiTech Transportbandsysteme GmbH, Hannover (DE)

(72) Inventors: Axel Eckmann, Wachtberg-Pech (DE); Patrick May, Göttingen (DE); Jack Bruce Wallace, Powell, OH (US); Clemens Panzer, Hamburg (DE); Ester Belen Bandiera, Munich (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 255 days.

(21) Appl. No.: 18/248,059

(22) PCT Filed: Sep. 2, 2021

(86) PCT No.: PCT/DE2021/200119
§ 371 (c)(1),
(2) Date: Apr. 6, 2023

(87) PCT Pub. No.: WO2022/073563
PCT Pub. Date: Apr. 14, 2022

(65) Prior Publication Data
US 2023/0365341 A1 Nov. 16, 2023

(30) Foreign Application Priority Data

Oct. 6, 2020 (DE) ..................... 10 2020 212 604.6

(51) Int. Cl.
*B65G 43/02* (2006.01)
*B64U 10/13* (2023.01)
(Continued)

(52) U.S. Cl.
CPC ............. *B65G 43/02* (2013.01); *B64U 10/13* (2023.01); *B64U 20/87* (2023.01); *B64U 10/14* (2023.01);
(Continued)

(58) Field of Classification Search
CPC ........... B65G 43/02; B65G 2203/0275; B65G 2203/041; B65G 2203/042; B64U 10/13;
(Continued)

(56) References Cited

U.S. PATENT DOCUMENTS

| | | | |
|---|---|---|---|
| 2012/0125736 A1* | 5/2012 | Twigger | ................. B65G 43/06 198/502.1 |
| 2016/0152416 A1 | 6/2016 | Staab | |
| 2018/0072416 A1* | 3/2018 | Cantrell | ................. B64U 10/13 |

FOREIGN PATENT DOCUMENTS

| | | |
|---|---|---|
| AU | 2019204926 A1 | 2/2020 |
| CN | 106347966 A | 1/2017 |

(Continued)

OTHER PUBLICATIONS

The International Search Report and the Written Opinion of the International Searching Authority mailed Jan. 7, 2022 on for the counterpart PCT Application No. PCT/DE2021/200119.

*Primary Examiner* — Benjamin R Schmitt
(74) *Attorney, Agent, or Firm* — Lippes Mathias LLP

(57) ABSTRACT

The present invention relates to a method for inspecting a facility (1), wherein the method comprises at least the automatically executed steps of: capturing (100a) optical data from at least one facility part (12, 13) of the facility (19), capturing (100b) acoustic data from at least the same facility part (12, 13) of the facility (19), and jointly evaluating (200) the captured optical data and the captured acoustic data.

5 Claims, 2 Drawing Sheets

Figure 1:
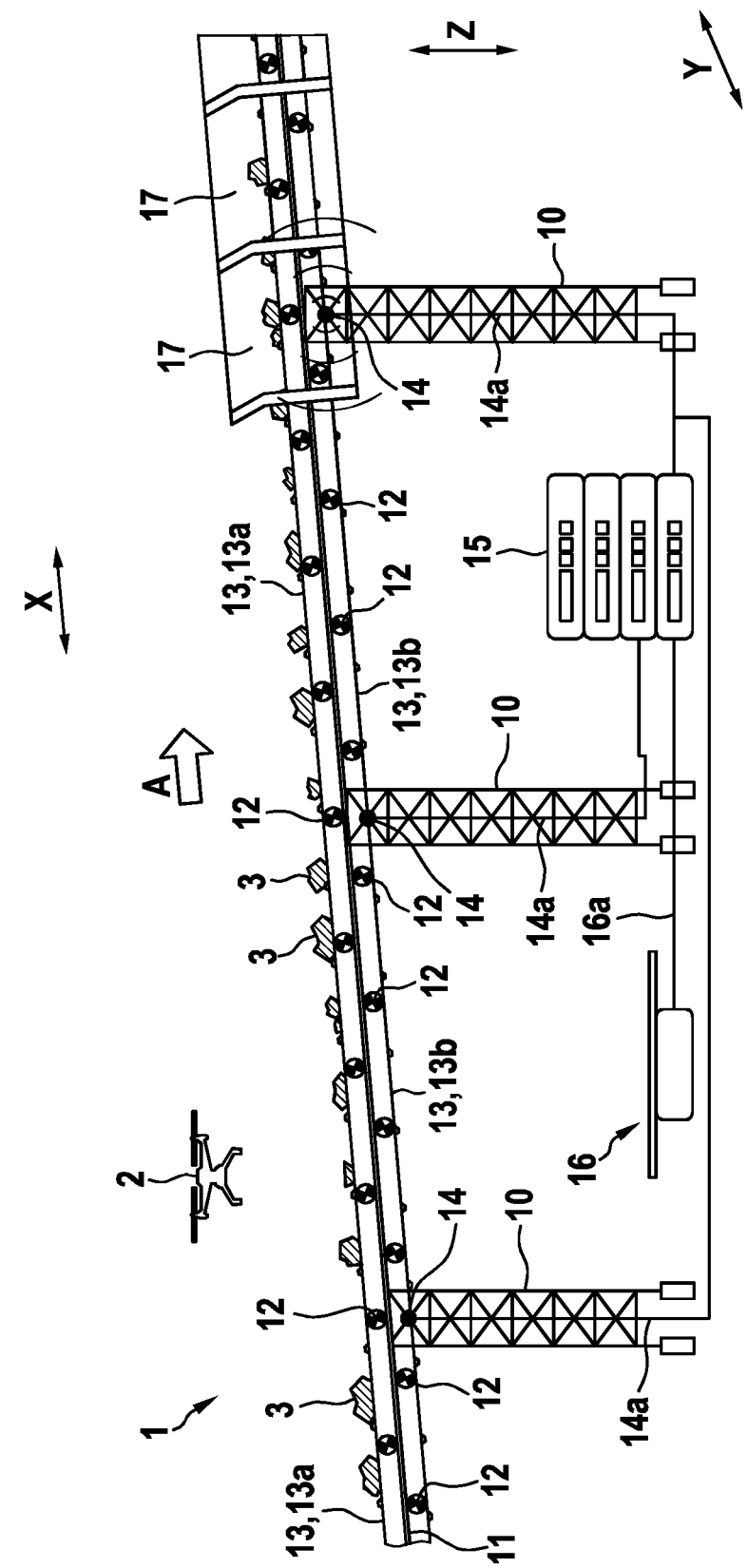

(51) Int. Cl.
*B64U 20/87* (2023.01)
*B64U 10/14* (2023.01)
*B64U 101/26* (2023.01)
*B64U 101/30* (2023.01)

(52) U.S. Cl.
CPC ...... *B64U 2101/26* (2023.01); *B64U 2101/30* (2023.01); *B65G 2203/0275* (2013.01); *B65G 2203/041* (2013.01); *B65G 2203/042* (2013.01)

(58) Field of Classification Search
CPC .... B64U 20/87; B64U 10/14; B64U 2101/26; B64U 2101/30
See application file for complete search history.

(56) References Cited

FOREIGN PATENT DOCUMENTS

| | | | |
|---|---|---|---|
| CN | 110641947 | A | 1/2020 |
| CN | 111498425 | A | 8/2020 |
| DE | 102012107847 | A1 | 2/2014 |
| EP | 3022137 | A1 | 5/2016 |
| WO | 2015009467 | A1 | 1/2015 |

* cited by examiner

METHOD FOR INSPECTING A FACILITY, PREFERABLY A CONVEYING FACILITY

The present invention relates to a method for inspecting a facility to various inspection systems for carrying out such methods, to a facility with such an inspection system, and to a computer program product with a program code for carrying out such a method.

Conveyor belts, which can also be referred to as transportation belts, are often used to transport in particular loose conveyed goods such as bulk material, for instance stones, ore, coal, grain, granulate, and the like, in mining, in industry, and on transport routes. Such conveyor belts are used in an endlessly closed manner in a conveyor belt facility or in a transportation belt facility. The conveyor belts usually consist at least substantially of a flexible material, such as an elastomeric material such as vulcanized caoutchouc, also known as rubber, in which tension members or reinforcements are embedded to transmit the tensile forces, running in the tension direction, transport direction or movement direction. In the case of conveyor belts which have to convey comparatively large or heavy loads, such tension members can be steel cables in particular, with textile fabrics also being common as tension members for smaller applications.

Such conveying facilities, which can also be referred to as conveyors, usually extend at least substantially in the horizontal plane, so that the individual components or facility parts of the conveying facility are arranged on a ground surface. The components of a conveying facility, which can also be referred to as facility parts, usually include at least one drive roller, which can be operated in rotation by means of a drive, and at least one deflecting roller at the opposite end of the conveying facility. The conveyor belt is endlessly closed and tensioned around the drive roller and the deflecting roller, with the result that the upper region of the conveyor belt, which can also be referred to as the upper run, can be moved in one direction by being driven by the drive roller and the lower region of the conveyor belt, which can also be referred to as the lower run, can be moved in the opposite direction.

Numerous rollers which support the upper run or the lower run of the conveyor belt in the vertical direction from below are usually arranged between the drive roller and the deflecting roller. Such rollers can also be referred to as support rollers. Usually, a plurality of, and in particular three, rollers are arranged next to one another in the transverse direction on the upper run of the conveyor belt, and the outer rollers are placed at an angle to the horizontal plane. This results in a concave shape of the upper run of the conveyor belt, with the result that the loose bulk material can be held to a certain extent laterally on the surface of the upper side of the conveyor belt in the transverse direction.

Such conveying facilities can be used, for example, in underground mining or in open mines, for example to transport the mined raw materials in the form of hard coal, iron ore, copper ore and the like, as described above. The conveying facilities can extend over tens of kilometers, and so lengths of closed conveyor belts of up to 40 km in length can be common for medium-sized conveying facilities, for example in open mines and the like. Such conveying facilities can have, for example, 120,000 rollers.

Since such conveyed goods are often pointed and sharp-edged, these conveyed goods can cause damage to the flexible material of the conveyor belt during transport and in particular when they hit the surface of the upper side of the conveyor belt. As a result, the elastomeric material of the conveyor belt might be removed at certain points and thereby weakened. There might even be breakthroughs to the underside of the conveyor belt. Increasing damage can extend to the tension members and also damage them. Such damage can also cause the tension members to be severed in the longitudinal direction. The tension members as steel cables might also be damaged by corrosion if the flexible material can no longer protect the tension members from external influences such as the effects of the weather, for instance moisture.

Such damage can lead to a failure of the conveying facility, for example due to tearing of the conveyor belt in the transverse direction and/or longitudinally extending slits through the flexible material of the conveyor belt. This can lead to the loss of conveyed goods currently located on the upper run of the conveyor belt, and to corresponding environmental damage. Purchasing and installing a new conveyor belt can also be time-consuming and expensive. In particular, however, the downtime of the conveying facility and any resulting downtime, for example, of the entire mine, the entire production plant, the entire port terminal, the entire goods station and the like, can result in very high costs due to the loss of the corresponding production or transport capacities. It should also be noted that such conveyor belts usually need to be produced in segments over a longer period of time, transported to the place of use, and closed there endlessly, which requires a corresponding lead time or time requirement.

It is therefore customary to inspect such conveying facilities regularly, both with regard to their facility parts and with regard to the conveyor belt, with the aim of detecting damage at an early stage or in good time before this damage can develop in such a way that the conveyor belt or conveying facility may fail as previously described. Rather, such damage is intended to still be repaired or the conveyor belt and/or facility parts should be able to be replaced in a planned manner (predictive maintenance).

Such monitoring of conveying facilities and/or conveyor belts is traditionally carried out by people who walk the conveying facilities at regular intervals, usually on foot, and in doing so visually examine the facility parts of the conveying facility, in particular its frame and the rollers arranged thereon, and also the conveyor belt during operation with their eyes and evaluate them based on their experience. While doing this, the person can also pay attention to the running noises of the rollers and/or of the conveyor belt. The observations made by the person that occur here are usually logged by hand and can be further evaluated later. In the case of continuous operation of a conveying facility, such monitoring or inspection usually takes place daily. This can be done by the same person or by different people. If conveying facilities are long enough, a plurality of people can work in parallel and always inspect different or always the same section of the conveying facility. If damage is detected during the inspection, action can be taken in this regard.

The disadvantage here is that such an inspection of conveying facilities and/or conveyor belts requires a great deal of personnel and a lot of time. This can lead to corresponding costs.

It is also disadvantageous that the result of the inspection can clearly depend on the person and in particular on their attentiveness and/or experience. In particular, this cannot be regarded as a standardized and uniform procedure for the inspection of conveying facilities and/or conveyor belts, since too many influencing factors can affect the quality of the inspection.

Another disadvantage is that the conveying facility, at least in sections, cannot be accessed at all or can be accessed only with difficulty by a person for inspection. This may be due to the fact that the conveying facility runs through rough terrain. The conveying facility, or at least its rollers and its conveyor belt, can also run at a clear distance from the ground surface, making it difficult or even impossible for the person to reach it directly. Conveying facilities that are used underground can also have these disadvantages. This can make inspection of the conveying facility or the conveyor belt more difficult, dangerous and/or tiring or even impossible for a person.

In other words, the visual and/or acoustic inspection of conveying facilities or their facility parts and/or their conveyor belts by people can be very complicated. In particular, the manual inspection of all components such as rollers along a conveying facility can be extremely time-consuming. Also, this inspection by people can create difficulties regarding the proper and reliable monitoring of the condition of the conveying facility. As a result, the timely maintenance of the components of the conveying facility before a critical state is reached can be very difficult, inefficient or require a great deal of personnel, in particular due to the length of the conveying facility, the accessibility of the conveying facility and/or the large number of components of the conveying facility to be inspected. In practice, it has also been shown that the ratio of critical components of a conveying facility that people have successfully identified is usually unsatisfactory and that there is still a high risk of serious damage and failure of the conveying facility or conveyor belt, which are caused by previously undetected damage.

AU 2019 204 926 A1 describes a system node for detecting a defective bearing of a conveyor. The system node comprises microphones at appropriate locations to capture sounds proximal to the conveyor. A controller is provided for performing a fast Fourier transform to obtain a frequency characteristic of the detected sounds. A harmonic of the defective bearing is determined from the frequency characteristic. In reaction to the determination of the harmonic, the controller identifies the defective bearing by comparing the phase of the harmonic at each location.

WO 2015 009467 A1 describes a method which inspects a conveyor having opposite sides and a length. The conveyor comprises an endless belt and a multiplicity of roller structures disposed in a spaced relationship along at least a portion of the length of the conveyor and under an upper run of the belt to support the belt while material is conveyed on the belt. Each roller structure comprises at least one roller that is constructed and arranged to rotate about an axis as the web carrying the material is conveyed. The method aligns an unmanned vehicle carrying a sensor structure with one side of the conveyor and causes the vehicle to move along the longitudinal section of the conveyor, while the sensor structure captures data regarding a condition of at least a portion of the belt and the rollers of the multiplicity of roller structures while the conveyor is in operation.

An object of the present invention is to provide a method for inspecting a facility and in particular a conveying facility of the type described in the introductory part, so that the disadvantages described above can be at least partially overcome or at least reduced. In particular, the use of persons should be able to be avoided. Additionally or alternatively, the quality of the inspection should be enhanced. Additionally or alternatively, a constant quality of the inspection should be achieved. In particular, this should be accomplished in a way that is as simple, inexpensive, practical, flexible and universally usable as possible. It is intended that at least one alternative to known methods of this type be provided.

The present invention thus relates to a method for inspecting a facility, wherein the facility may in particular be a conveying facility as described in the introductory part, but also another facility such as a production plant, another transport facility or the like, as will be described in more detail below.

The method includes at least the automatically executed steps of:

capturing optical data from at least one facility part of the facility, capturing acoustic data from at least the same facility part of the facility, and jointly evaluating the captured optical data and the captured acoustic data.

The at least one facility part of the facility can be any component or any section of the facility. In the case of a conveying facility, this can in particular be the rotatable components such as, for example, the drive roller, the deflecting roller and the rollers, as will be described in more detail below. Such facility parts can be sufficiently accessible so that optical data and also acoustic data of the facility part can be captured.

Both the optical data and the acoustic data are captured in each case by suitable sensors, as will be described in more detail below. The evaluation takes place electronically, for example in a control unit or the like. As a result, an automatic or self-acting sequence of the method according to the invention can be implemented without the intervention of a person being required. The method according to the invention can be carried out and preferably also be started and/or terminated completely without the involvement of a person.

The present invention is based on the finding that, through the combined evaluation by means of suitable methods and algorithms, as will be described in more detail below, both optical data and acoustic data can be used for inspecting a facility, i.e. for assessing the condition of the facility or at least one facility part of the facility, as has hitherto been known to happen only by way of human inspection of such facilities by persons. In this way, the information which can be obtained both from the optical data and from the acoustic data can be combined, as a result of which the quality of the inspection can be increased. In particular, human behavior can no longer negatively affect the quality of the inspection. As a result, a consistently high and standardized quality of the inspection can be achieved.

The result of the inspection can in particular be an insight into the current condition of the inspected facility part of the facility, so that in particular wear, damage and the like can be detected. In particular, it should be possible to detect wear, damage and the like before they can lead to major damage or even to failure of the facility. In particular, this should enable timely repair of the detected wear, the detected damage and the like. These findings can also be used for the forward-looking planning of the next maintenance of the facility (predictive maintenance).

Optical data and acoustic data can be captured using various technical means or their corresponding sensors, as will be described in more detail below.

According to one aspect of the invention, optical data and acoustic data are captured parallel to one another in terms of time or temporally offset to one another. As a result of the temporally parallel capturing of the optical data and the acoustic data, the temporal assignment of the captured data to one another can be simplified. If necessary, the spatial assignment of the data captured in parallel to one another can also be simplified. The capturing possibilities can be expanded by the temporally offset capture of the optical data and the acoustic data. In particular, the capturing of the optical data can take place with different technical means, for example by means of a drone, than the capturing of the acoustic data, for example by means of stationary sensors, as will be described in more detail below.

According to a further aspect of the invention, the method includes at least the further step of:

in reaction to the joint evaluation, modifying, preferably terminating, the operation of the facility.

In other words, the result of the evaluation of the captured data can be used to influence the operation of the facility. In particular, if wear or damage to the inspected facility part is detected, the operation or use of the facility can be reduced in order to avoid or at least reduce the progression of the wear or damage. In particular, the result of the evaluation can also lead to the operation of the facility being temporarily terminated or interrupted in order in particular to prevent the detected wear or the detected damage from affecting the operation of the facility.

According to a further aspect of the invention, the method includes at least the further step of:

in reaction to the joint evaluation, outputting at least one piece of information about the facility, preferably to at least one user.

The output of such information to the outside, for example, of a control facility which carries out at least the evaluation of the captured data of the method according to the invention can make it possible to use the findings gathered from the captured data by means of the evaluation in a variety of ways and, in particular, to store them outside the facility, further evaluate them or use them in another way. This can be done in particular by other control facilities or the like.

Alternatively or additionally, this at least one piece of information can be output to a user or a person in order to inform them of the findings gathered. The information can be output, for example, visually via a screen, via lights, such as warning lights in particular, and the like. Additionally or alternatively, the information can also be output to the user acoustically via signals and in particular warning signals, via voice output and the like. Additionally or alternatively, the information can also be output to the user haptically, for example via the vibration of a mobile terminal device such as a smartphone, a tablet and the like. The use of a mobile terminal device can also enable the combination of acoustic, visual and/or haptic output to the user, for example by means of an app.

According to a further aspect of the invention, optical data are captured by means of at least one flying drone, preferably in hovering flight. A drone is understood to mean an unmanned aerial vehicle that can fly independently relative to the facility and can capture at least the optical data using suitable sensors. The drone can preferably be designed as a quadrocopter. As a result, the facility part to be inspected can be reached very quickly, flexibly and independently of the ground surface of the facility, and the optical data can be captured there. Capturing the optical data in hovering flight, during which the drone remains in one place in the air, can improve the quality of the captured optical data, since these cannot be disturbed or can be disturbed comparatively little by the flight movement of the drone.

According to a further aspect of the invention, the drone is located directly adjacent to the facility part to be inspected when the optical data are captured. This means that the drone is sufficiently close and aligned with the facility part to be inspected by way of its optical sensor system as directly as possible and at least without blocking the optical capture region of the optical sensor system. This can improve the quality of the captured optical data.

According to a further aspect of the invention, optical data are captured both in the RGB color space and in the IR spectrum. In other words, the optical data are captured both in color in the range of the spectrum of electromagnetic radiation that is visible to humans and in its infrared range. The optical data thus also comprise radiometric data. This can provide more information for the evaluation. In particular, different pieces of optical information can be obtained and later combined with one another, as will be described in more detail below.

According to a further aspect of the invention, acoustic data are also captured by means of the flying drone, preferably in hovering flight, preferably by means of a directed acoustic receiving element of the drone. For this purpose, microphones or the like, which the drone has, can be used in particular as the acoustic sensor system. In particular, the optical sensor system and the acoustic sensor system of the drone can be aligned in the same direction in order to be able to be directed simultaneously and jointly at the facility part to be inspected. In particular, the optical data and the acoustic data can be captured at the same time. In any case, the effort can be kept low because the drone can capture both the optical data and the acoustic data. This can also ensure that the optical data and the acoustic data are captured at the same time. This can also ensure that the optical data and the acoustic data of the same facility part are captured. This can improve the evaluation.

According to a further aspect of the invention, acoustic data are captured by means of a, preferably directional, acoustic receiving element or by means of a plurality of, preferably directional, acoustic receiving elements of the facility. In particular, microphones or the like can be used as such an acoustic sensor system. This acoustic sensor system can be arranged as acoustic receiving elements in particular in a stationary manner at the facility. In this way, the function of capturing optical data, for example by means of a drone, and the function of capturing acoustic data by means of the plurality of acoustic receiving elements can be separated from one another spatially and, if necessary, also in terms of time. This can enable very flexible, consistent and, in particular, drone-independent capturing of the acoustic data.

In particular, in this way the acoustic receiving elements can be arranged in a stationary manner at at least one stationary facility part and preferably at a plurality of stationary facility parts, preferably one acoustic receiving element per facility part, in order to capture the acoustic data there. In this way, acoustic data can always be captured at the same location of the facility from the same facility parts located there.

In particular, in this way, the acoustic receiving elements can additionally or alternatively be arranged in a stationary manner at at least one movable facility part, such as at a conveyor belt of the facility as the conveying facility, in order to capture the acoustic data there. The acoustic sensor system can thus be arranged at least additionally or alone in a concomitantly movable manner within the conveying facility. In this way, acoustic data can be captured from those locations in the facility, and from the facility parts located there, past which the acoustic receiving elements are moved. For example, based on position data such as GPS data and/or based on time stamps of the acoustic receiving elements, the captured acoustic data can then be assigned to a specific position at the facility.

According to a further aspect of the invention, the facility is a conveying facility with an endlessly closed conveyor belt in operation, with the facility parts of the conveying facility driving, deflecting and/or supporting the conveyor belt. In this way, the properties and advantages of the method according to the invention described above can be applied to a conveying facility.

According to a further aspect of the invention, the facility parts of the conveying facility are rollers. In this way, rollers in particular can be inspected or monitored according to the invention. This can be of particular interest in a conveying facility, since a large number of rollers are used and these can wear out or become damaged during operation. The rollers of a conveying facility are also distributed over its entire longitudinal extent and can thus be positioned at locations on the conveying facility that are difficult or impossible for people to access. This can be improved in particular by using a drone and/or stationary acoustic receiving elements, as described above.

According to a further aspect of the invention, optical data and acoustic data are captured temporally over at least one complete revolution of the conveyor belt. In this way it is possible to achieve that the conveyor belt of the conveying facility can be completely captured optically and/or acoustically by the method according to the invention.

According to a further aspect of the invention, absolute or relative position information is assigned to the captured optical data and/or the captured acoustic data during the capturing. As a result, the captured data can be assigned to the inspected facility part, which can be helpful in particular when there are a plurality of facility parts to be inspected, for example to assign wear or damage detected from the captured data to the correct facility part and be able to initiate appropriate measures, as previously described.

According to a further aspect of the invention, distance information with respect to the facility part to be inspected is assigned to the captured optical data and/or the captured acoustic data during the capturing. In this way, further information can be made available, which can be useful when evaluating the captured data.

According to a further aspect of the invention, the method is automatically repeated at predetermined times or at predetermined time intervals. This can enable regular or continuous inspection or monitoring of the facility, which can take place automatically without the intervention of a user.

The present invention also relates to an inspection system for inspecting a facility, preferably a conveying facility, with at least one drone which is designed to capture both optical and acoustic data, and with at least one control unit designed to carry out the method as described above. An inspection system can thereby be made available in order to implement the properties and advantages of the corresponding method according to the invention described above.

The present invention also relates to an inspection system for inspecting a facility, preferably a conveying facility, with at least one drone which is designed to capture optical data, with a plurality of acoustic receiving elements which are designed to capture acoustic data, and with at least one control unit which is designed to carry out the method as described above. An alternative inspection system can thereby be made available in order to implement the properties and advantages of the corresponding method according to the invention described above.

The present invention also relates to a facility, preferably a conveying facility, with at least one inspection system as described above. A known facility and in particular a known conveying facility can thereby be developed into a facility according to the invention and in particular a conveying facility according to the invention by using at least one inspection system according to the invention as described above in order to implement the properties and advantages of the corresponding method according to the invention described above.

The present invention also relates to a computer program product with a program code stored on a computer-readable medium, for carrying out a method as described above. In other words, the present invention also relates to a computer-readable medium on which a program code for carrying out a method as described above is stored. The computer-readable medium can be an internal memory of a control unit such as a computer, as well as a removable memory such as a disk, a CD, a DVD, a USB stick, a memory card, a cloud server and the like. In this way, the method according to the invention can be made available, for example, to a control unit, in particular of an inspection system according to the invention, in particular a facility according to the invention.

In other words, the present invention is based on the idea of replacing the human and human-controlled process of visually and acoustically inspecting conveying facilities in particular by doing so automatically, i.e. by electronics and by computer-implemented data processing, for example with the support of a drone. For capturing optical data, the drone can be equipped with at least one optical image capturing unit such as a camera, for example an RGB camera and/or an IR camera. Furthermore, acoustic monitoring devices such as microphones can be used, which are able to capture audio data in particular at fixed intervals.

Both systems, i.e. the automatic capture of optical data, e.g. using a drone, and the automatic capture of acoustic data, e.g. by means of microphones, can operate in parallel and complement each other or operate separately. This may depend on environmental conditions and/or on those of the facility or on the conveyor belt configurations, such as the ratio of a mine site of the conveying facility with an enclosure for the conveyor belt, for example underground, or without an enclosure for the conveyor belt.

To capture the optical data, the drone can have specific measuring instruments, at least one optical image capturing unit, such as a camera, for example an IR camera, an RGB video camera and/or the like. In particular, stereographic image data with depth information can be captured. In addition, the drone itself can have at least one acoustic capture device, such as a microphone and in particular a directional microphone, in order to be able to additionally capture the acoustic data.

The drone can also have additional sensors, which can capture further information about the facility or the conveying facility. This can be distance information, for example, in order to be able to take into account in the later evaluation of the captured data the distance from the drone to the facility part at which these data were captured. This information can be captured, for example, by means of a lidar sensor (laser detection and ranging) of the drone.

Furthermore, the drone can have a position capturing unit such as a GPS receiver in order to detect its own position and in particular to automatically follow a predetermined flight path and to capture at least optical data, and preferably additionally acoustic data of the facility part of the facility, along the predetermined flight path, in particular at specific predetermined positions of the predetermined flight path in hovering flight. The captured data could be stored by the drone and later transmitted or be directly transmitted wirelessly.

The sensor system of the drone can be calibrated before use. The drone can then be instructed to regularly fly a predefined inspection routine next to the facility and in particular along the conveyor belt of a conveying facility and to visually inspect the exposed facility parts of the facility or the conveying facility and/or its conveyor belt by capturing optical data. Additional acoustic data and further information may possibly be captured.

The configuration of the drone and the flight routines of the drone can be programmed into the drone via a flight planning application. As a result, a complete inspection plan for all facility parts of the facility or the conveying facility and/or the conveyor belt can be planned and regularly repeated. In this way, the flight or inspection plans can also specify a plurality of facilities in order to have the drone inspect a plurality of facilities, so that there is no need to procure a separate drone for each facility, and instead one drone can be used for a plurality of facilities. This can reduce the acquisition and operating costs accordingly.

The drone with its sensor system can be trained to monitor specific positions of the facility and always record step by step in a hovering, unmoving position photo material and/or video data as optical data or as optical and as visual data of the defined inspection locations before the drone flies to the next inspection point. For example, inspection points could be located on either side of the facility and in particular of the conveyor belt of the conveying facility.

After completing the planned routine or flight route, the drone can fly back to its "home base" on its own to charge the batteries and prepare for the next flight. Alternatively, the batteries can also be replaced, in particular automatically, in order to make the drone available again more quickly. During the charging time, the captured or recorded optical data can be downloaded from an internal memory of the drone for example to a control unit of the facility or to a separate control unit and, if necessary, uploaded to a cloud data backend via a connected IoT gateway. After a successful upload, the internal memory of the drone can be released again for the next flight data.

In addition to or instead of the acoustic sensor system of the drone, acoustic monitoring devices can be installed along the facility and in particular along the conveying facility or along the conveyor belt at specific positions or at specific intervals, for example at a distance of approx. 20 m to approx. 25 m. The acoustic monitoring devices such as microphones and in particular directional microphones can be operated either individually, in groups or together independently, for example by battery and/or solar power, or can be connected to an electrical supply network via a supply cable. The acoustic monitoring devices can be designed to be able to be used in an industrial environment, for example through the use of housings with appropriate or sufficient IP class protection.

The acoustic monitoring devices can be designed to communicate with each other either wirelessly via technologies such as WIFI, LoRaWAN or other such methods, or the acoustic monitoring devices can be wired, such as via a cable wire, via a connection to an endpoint such as an edge device. This also applies to the data link of the acoustic monitoring devices to a higher-level control unit or the like. The acoustic monitoring devices can likewise be designed to send their captured acoustic data by means of wireless data transmission to the drone described above over a comparatively short signal path, which can be initiated by the drone on its flight route if the distance is sufficiently small, for example. As a result, the captured acoustic data from the acoustic monitoring devices can be transferred to the drone, so that the captured data of both the drone and the acoustic monitoring devices can be uploaded by the drone later, as described above, for example to a control unit, a data memory and the like.

The acoustic monitoring devices can, for example, record samples (audio recording, audio samples), for example in the form of approximately two-minute acoustic recordings of their surroundings. The acoustic monitoring devices can regularly record these samples at defined time intervals, for example spread out through the day. After the acoustic monitoring devices have captured the audio recording as acoustic data, the acoustic monitoring devices can upload the captured acoustic data to, for example, the aforementioned cloud backend storage, by themselves or via an endpoint such as an edge device. After the acoustic monitoring devices have successfully sent the captured acoustic data to the cloud, for example, the acoustic monitoring devices can be put into a sleep mode to save energy or enter a sleep mode themselves until the acoustic monitoring devices automatically wake up for the next recording and uploading interval.

Based on the captured data, properties of the facility or the conveying facility can be identified or determined by appropriate evaluations, which can be carried out, for example, by means of an aforementioned control unit. In particular, damage to the facility or the conveying facility can be detected or determined in this way. In particular, damage can be detected or determined at an early stage before it can lead to serious damage and/or to a failure or standstill of the facility or the conveying facility. This applies in particular to moving or driven facility parts of the facility or of the conveying facility and/or the conveyor belt of the conveying facility. In particular, misaligned rollers or even non-rotating rollers can be identified as idle rollers or as blocked rollers by the captured optical and/or acoustic data.

For this purpose, the captured optical and/or acoustic data can be analyzed by two different AI (artificial intelligence) algorithms, in particular by the control unit and in particular as uploaded data on a data memory which the control unit can access.

This can be a convolutional neural network (CNN or ConvNet, for short), which can evaluate the optical image data, for example as photo material and in particular as optical RGB and optical IR data by way of the neural network first identifying the component of interest in the RGB image material and then comparing the region of interest in the respective RGB frame with the same frame in the IR image material. This can be done by comparing a timestamp of each frame and looking at the frames with exactly the same timestamp. The neural network algorithm can examine the region of interest in the IR image material and categorize the region of interest as critical or non-critical based on defined criteria. A defect detected in these frames can be combined with GPS data to localize that defect along the conveyor belt of the conveying facility in the field.

This allows a support vector machine algorithm to analyze the recorded audio files as captured acoustic data and to extract the features in the time and frequency spectrum. The support vector machine algorithm can be trained on a wide range of errors of specific frequencies, which can indicate the fault condition of the relevant component of the facility. The support vector machine algorithm can categorize the audio files into critical or non-critical based on defined criteria. In particular, the audio files can be evaluated in a binary manner for errors/no errors in a first step. In a second step, all detected errors can then be classified into different categories, e.g. bearing damage, damage to roller shells caused by rubbing against the belt, etc.

This may also be a combination of a convolutional neural network and a support vector machine algorithm.

A customer portal for the operator of the facility as a graphical user interface (GUI) can display the results of the inspection of the facility according to the invention in an intuitive visualization with all critical findings, which may result from the captured optical and/or acoustic data as visual or acoustic files, to a user and, if necessary, automatically issue or send warnings about the most critical components. This can provide the user with a more detailed insight into the condition of the facility. The maintenance of the facility can be planned proactively by the user or operator, which can reduce their effort and/or facilitate the availability of the facility. Warning messages can be generated by the control unit in good time before a serious failure of the facility.

One advantage in particular is that a drone can reach much greater heights and safely monitor or inspect the facility in almost all situations. In particular, the risk of human accidents can be reduced. Images (IR, photographic), noise measurements, GPS data, etc. can be recorded or captured daily from defined positions, so that the process of monitoring or inspection can be carried out automatically and driven by data. Thus, the use of drones for accurate measurement and inspection purposes can reduce maintenance costs and save time. The inspection method, the inspection quality and the data quality can be standardized at a high level, and can be obtained in particular independently of people and their experience, skills and attentiveness.

Such monitoring or inspection of facilities according to the invention can also be used, for example, to inspect industrial and offshore hoses, to inspect railway infrastructure, to inspect agricultural fields and crops and to inspect ports handling bulk material. In particular, conveying facilities can be inspected, as previously described.

Figure 2:
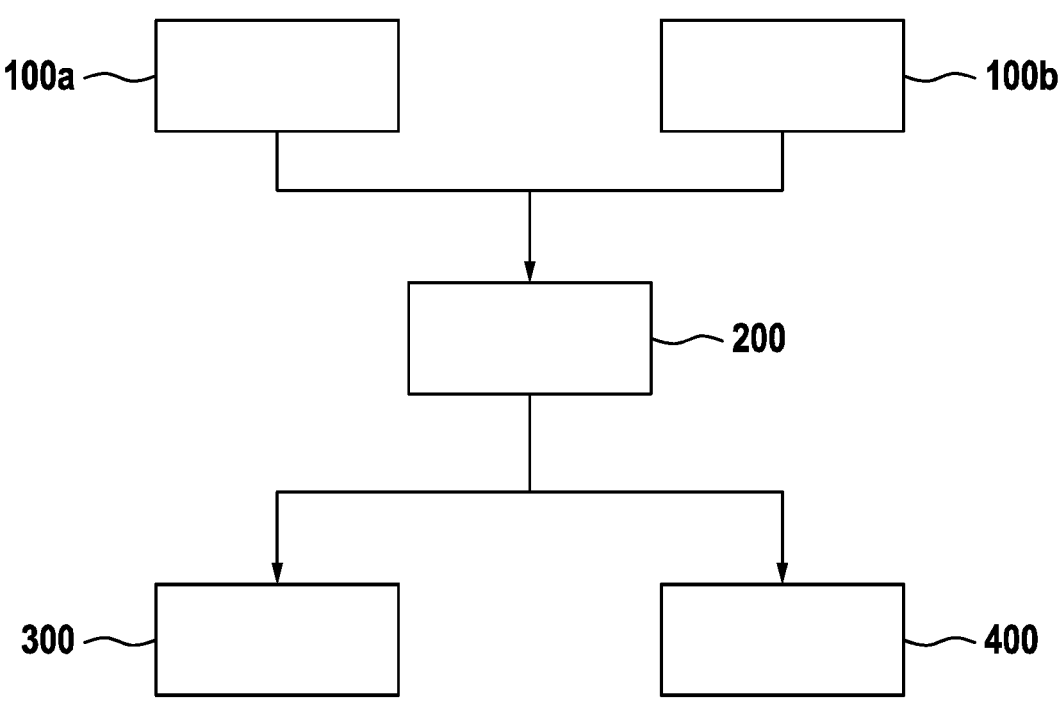

An exemplary embodiment and further advantages of the invention will be discussed below in conjunction with the following figures. In the drawings:

FIG. 1 shows a perspective schematic illustration of a facility in the form of a conveying facility with an inspection system according to the invention when carrying out a method according to the invention; and FIG. 2 shows a flow chart of the method according to the invention.

The description of the aforementioned figures is given in Cartesian coordinates with a longitudinal direction X, a transverse direction Y, which is perpendicular to the longitudinal direction X, and a vertical direction Z, which is perpendicular both to the longitudinal direction X and to the transverse direction Y. The longitudinal direction X may also be referred to as the depth X, the transverse direction Y may also be referred to as the width Y, and the vertical direction Z may also be referred to as the height Z. The longitudinal direction X and the transverse direction Y together form the horizontal plane X, Y, which can also be referred to as the horizontal X, Y.

In FIG. 1, a facility 1 in the form of a conveying facility 1 is considered. The conveying facility 1 is set up on a ground surface (not denoted) by means of support elements 10 in the form of pillars 10. A supporting structure 11 is held by the pillars 10 and is spaced apart from the ground surface in the vertical direction Z. The supporting structure 11 can also be referred to as a frame 11 of undercarriage 11.

Various facility parts 12 of the conveying facility 1 are arranged at the supporting structure 11 and can also be referred to as components 12 of the conveying facility 1. The facility parts 12 include a drive roller (not shown) arranged at one end of the conveying facility 1, a deflecting roller (not shown) arranged at the opposite end of the conveying facility 1, and a multiplicity of rollers 12 arranged inbetween. A closed conveyor belt 13 runs around the facility parts 12 and forms an upper run 13a at the top in the vertical direction Z and a lower run 13b lying opposite thereto at the bottom in the vertical direction Z. The conveyor belt 13 can be operated so that it keeps revolving by means of the drive roller, and as a result the upper run 13a of the conveyor belt 13 moves in the longitudinal direction X in a conveying direction A, which can also be referred to as the running direction A or as the movement direction A. On the upper side or outside (not denoted) of the upper run 13a of the conveyor belt 13, conveyed goods 3 in particular in the form of bulk material 3 can be received and transported in the conveying direction A with the conveyor belt 13.

An inspection system 14, 2 according to the invention is used to inspect the conveying facility 1, in particular with regard to the condition of the conveyor belt 13 and the facility parts 12, in particular the rollers 12, and the known conveying facility 1 described above is thereby further developed into a conveying facility 1 according to the invention.

For this purpose, a drone 2 is used, which has an optical sensor system in the form of an RGB camera and an IR camera for capturing optical signals, so that the optical signals detected can be represented by optical data. These optical data can first be stored by the drone in order to be able to capture a large quantity of optical data at different positions on a flight route. If the drone lands on a drone landing pad 16 in the region of the conveying facility 1 after completing the flight route, the stored optical data can be sent wirelessly or by wire directly to a control unit 15 or first to a receiving unit (not shown) of the drone landing pad 16, which can then forward the received optical data to the control unit via a cable connection 16a. The drone 2 can also be recharged electrically at the drone landing pad 16 in order to be ready for the next flight route.

Moreover, numerous acoustic receiving elements 14 are arranged, as components of the inspection system 14, 2 according to the invention, in a stationary manner along the conveying facility 1. This can be done at the upper end of the pillars 10, for example. The acoustic receiving elements 14 are designed as an acoustic sensor system for capturing acoustic signals, i.e. of airborne sound, so that the captured acoustic signals can be represented by acoustic data. The acoustic receiving elements 14 can also be referred to as acoustic monitoring devices 14 and be implemented as microphones 14. The microphones 14 can in turn be connected to the control unit 15 by means of a cable connection 14a. The microphones 14 are each aligned toward the facility parts 12 in order to capture the noises which are generated by the facility parts 12 when the conveying facility 1 is in operation. This can be facilitated by the use of an enclosure 17, which encloses the conveying facility 1 in cross section at least in sections and can thereby at least reduce noise from outside the conveying facility 1.

During operation of the conveying facility 1, a method according to the invention can thus be carried out as follows in order to inspect or monitor the facility parts 12 and thereby in particular to identify wear and damage as early as possible.

In a first step 100*a* of the method according to the invention, optical data from exactly one facility part 12 in the form of a roller 12 are captured by means of the drone 2, which is hovering in the transverse direction Y thereto immediately adjacent to and at a sufficient distance from the roller 12 to be inspected. The optical sensors of the drone 2 in the form of both the RGB camera and the IR camera are directed jointly at the roller 12 to be inspected. Both photos and films can be captured as the optical data. The captured optical information is stored as the optical data previously described.

In a further step 100*b*, acoustic data of at least the same roller 12 is captured. This can be done by an appropriate acoustic sensor system such as a directional microphone of the drone 2, so that the captured optical data of the captured acoustic data can be assigned to the same roller 12 both temporally and spatially or locally. Alternatively and preferably, this step 100*b* can also be carried out by at least one microphone 14 which is arranged sufficiently close to the roller 12 to be inspected in order to capture acoustic information which can at least also be caused by the roller 12 to be inspected. Within the scope of this step 100*b*, however, a plurality of microphones 14 and in particular all microphones 14 can also capture acoustic information which can be assigned to the corresponding microphone 14 in each case. The optical data of a roller 12 captured by the drone 2 can then be assigned to the corresponding acoustic data of the same roller 12 captured by a microphone 14, for example using the times at which the data were captured.

The captured data can then be made available to the control unit 15, which can be a separate control unit 15 of the inspection system 14, 2 according to the invention or an existing control unit 15 of the conveying facility 1, and stored there, as described above. Using suitable methods and algorithms, the control unit 15 then carries out a joint evaluation of the captured optical data and the captured acoustic data in a further step 200. As part of this evaluation, the respective condition of the inspected rollers 12 and/or the condition of the conveyor belt 13 can be determined and, if necessary, categorized.

In a further step 300, in reaction to the joint evaluation 200, the operation of the conveying facility 1 can be changed and in particular terminated if, for example, damage was detected during the evaluation. Additionally or alternatively, in a further step 400, in reaction to the joint evaluation 200, at least one piece of information about the conveying facility 1 can be output to at least one user in order to inform the user of the result of the evaluation.

LIST OF REFERENCE SIGNS (PART OF THE DESCRIPTION)

A Conveying direction; running direction; movement direction
X Longitudinal direction; depth
Y Transverse direction; width
Z Vertical direction; height
X, Y Horizontal plane; horizontal 1 Facility; conveying facility
10 Support elements; pillars
11 Supporting structure; frame; undercarriage
12 Facility parts; components; rollers
13 Conveyor belt
13*a* Upper run of the conveyor belt 13
13*b* Lower run of the conveyor belt 13
14 Acoustic receiving elements; acoustic monitoring devices; microphones
14*a* Cable connection of the microphones 14
15 Control unit
16 Drone landing pad
16*a* Cable connection of the drone landing pad 16
17 Enclosure
2 Drone
3 Conveyed goods; bulk material
100*a* Capturing optical data
100*b* Capturing acoustic data
200 Jointly evaluating captured optical data and captured acoustic data
300 Changing or terminating the operation of the facility 1
400 Outputting at least one piece of information about the facility 1

The invention claimed is:

1. An inspection system for inspecting a conveying facility, the system comprising:
    at least one drone to capture both optical and acoustic data;
    an RGB camera;
    a plurality of acoustic sensors, and
    at least one control unit configured to:
        capture optical data from a plurality of rollers of the facility (19) using the RBG camera and the infrared camera;
        capture (100*b*) acoustic data from the plurality of rollers using the plurality of acoustic sensors;
        jointly evaluate the captured optical data and the captured acoustic data to determine conditions for the plurality of rollers; and
        wherein the plurality of acoustic elements are located on the conveying facility and the infrared camera is located on a drone.

2. The system of claim 1, further comprising a memory having a program code implemented by the control unit.

3. The system of claim 1, comprising a plurality of drones each comprising a GPS receiver to detect position, capture additional optical data and additional acoustic data at a plurality of positions, store the captured additional optical data in the additional acoustic data and transmit the captured additional optical data and the additional acoustic data.

4. The system of claim 1, wherein the camera sensors are movable and the acoustic sensors are stationary.

5. The system of claim 1, further comprising a drone landing pad configured to send stored optical data to the at least one control unit and recharge a drone.

* * * * *